July 19, 1955
H. B. SISSON
2,713,379
MAGNETIC DEVICE FOR CLAMPING OVERLAPPING
PARTS DURING ADHESIVE BONDING
Filed Nov. 25, 1952
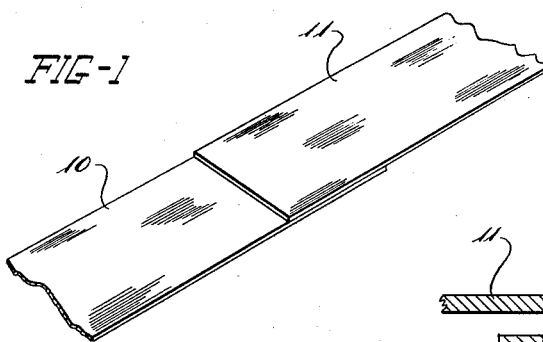
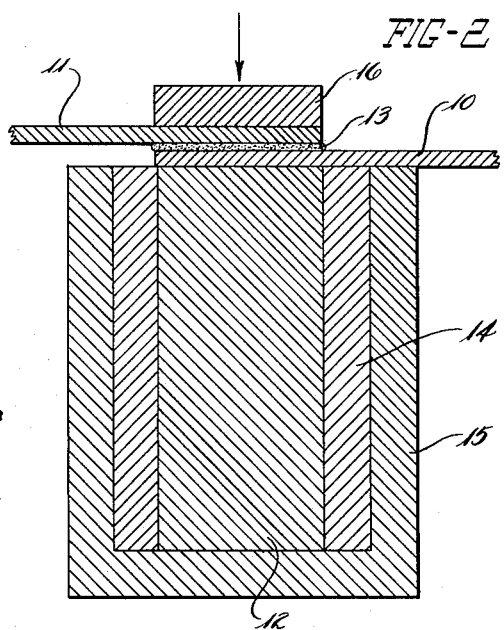
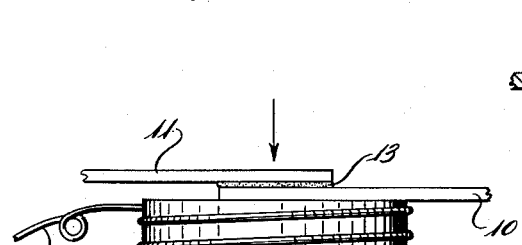
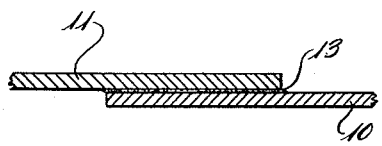
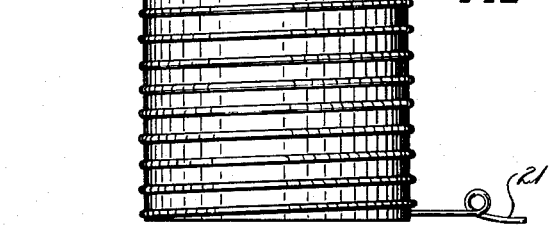
INVENTOR.
HOMER B. SISSON
BY W. A. Fraser
ATTY-

United States Patent Office 2,713,379
Patented July 19, 1955

2,713,379

MAGNETIC DEVICE FOR CLAMPING OVERLAPPING PARTS DURING ADHESIVE BONDING

Homer B. Sisson, Detroit, Mich., assignor to The Firestone Tire & Rubber Company, Akron, Ohio, a corporation of Ohio Application November 25, 1952, Serial No. 322,391

2 Claims. (Cl. 154—1)

The invention relates generally to the bonding together of overlapping portions of articles, and more particularly to the continuous clamping or squeezing together of such overlapping portions at substantially constant pressures during the setting of an adhesive bond therebetween.

In many fabricating industries sheet or plate-like elements are joined by bonding overlapping portions together and this has been done in various ways, such as spot or seam welding. In the fabricating of metal cabinets and the like, for example, the bonding has been commonly done by spot welding. Recently, the bonding in many cases has been done more economically by inserting a bonding film or bonding adhesive between the overlapping parts, and clamping the parts together until the film or adhesive sets. The film or adhesive may be thermosetting or cold setting, and forms a very strong and continuous joint.

Heretofore, the clamping of the overlapping parts has been accomplished by the use of more or less conventional C-clamps, and since all such adhesives have a shrinkage factor, causing the film to diminish in thickness, during the setting period, the clamps have been spring-loaded in order progressively to increase the applied pressure as the adhesive shrinks and thus maintain a substantially constant squeezing pressure on the overlapping portions of the joint until the bonding film is fully set.

There are several serious disadvantages to the foregoing method of clamping overlapping adhesively bonded parts during the setting period. In the first place, the operation of applying numerous C-clamps along the portions to be bonded is a slow and costly task, and it is extremely difficult to uniformly clamp uneven surfaces and corners so as to have proper follow-up pressure during the setting period. Moreover, in the case of certain deep cabinets or boxes, it is practically impossible to reach and properly clamp all parts of the joint.

Another disadvantage in connection with the use of C-clamp structures on joints containing a thermo-setting bonding film or adhesive, is that additional time and expense is involved in heating the metal mass of the clamps to the setting temperature and in cooling down, and furthermore, the setting temperatures have a deleterious effect on the springs of the clamps, requiring frequent replacement and thereby additional cost, particularly in continuous production.

It is an object of the present invention to provide an improved method and apparatus for clamping overlapping parts during adhesive bonding, whereby the foregoing disadvantages are overcome. The apparatus is simple, inexpensive, has no springs or other parts affected by the setting heat of the adhesive, and is very quickly and easily applied to the overlapping parts of adhesively bonded joints to apply constant clamping pressure during the setting of the adhesive to the joint parts, including uneven surfaces and parts which are difficult of access.

The purposes of the invention are accomplished by the parts, combinations, apparatus and methods comprising the present invention, preferred embodiments of which are shown and described herein by way of example, the scope of the invention being defined in the appended claims.

Referring to the drawing forming part hereof:

Figure 1 is a fragmentary perspective view of two metal strips having overlapping portions to be joined by an adhesive film;

Fig. 2 is a schematic sectional view showing one form of the novel magnetic clamping apparatus applied to the overlapping strips having uncured adhesive film therebetween;

Fig. 3 is a similar view showing how the film shrinks or decreases in thickness during the setting period;

Fig. 4 is a fragmentary sectional view of the finished joint or bond; and

Fig. 5 is a view similar to Fig. 2 showing a modified form of apparatus applied to the adhesively bonded overlapping strips.

Similar numerals refer to similar parts throughout the several views of the drawing.

The strips 10 and 11 may be sheet metal and represent any two elements of sheet material which have overlapping portions to be joined together, as in the fabrication of cabinets, boxes, furniture, etc. In the bonding of overlapping metal portions, bonding films or adhesives are available on the market which under proper pressure on the joint during the setting of the adhesive will produce a joint stronger than the metal itself. These bonding adhesives are available as thermo-setting or cold setting adhesives, and all varieties shrink to a substantial extent during setting. As previously set forth, the clamping or squeezing pressure on the joint parts must be substantially constant as the adhesive sets, and provision must be made to compensate for the decrease in thickness of the adhesive film, or in other words, a follow-up pressure must be applied during the setting period.

The present invention comprises applying the clamping or squeezing pressure to the joint parts by applying magnetic lines of force drawing the overlapped portions of the joint together. The magnetic force may be supplied by permanent or electrically energized magnets applied to the joints, and the shapes of the magnets may be varied to conform to the shape of the parts to be joined.

Referring to Fig. 2, a permanent bar magnet is shown at 12 applied to the underside of the joint between the overlapping portions of the strips 10 and 11. The bonding film or adhesive 13 is shown between the strips in an unset or uncured condition and the magnetic lines of force act in the direction of the arrow to squeeze the overlapping portions of the strips together against the film 13. The bar magnet 12 may be made of the aluminum-nickel-cobalt alloy which is commonly known as alnico and has high magnetic force.

The magnetic core 12 may be encased in a sleeve 14 of non-magnetic metal such as lead which is in turn enclosed in an outer soft iron shell 15 which may be closed at the bottom end as shown. This arrangement obtains greatly increased magnetic energy from the alnico magnetic core, because the non-magnetic sleeve is used to establish an air gap around the core before it is magnetized. A relatively small permanent magnet having this construction will apply a constant squeezing force of about 30 pounds per square inch of permanent magnet area, which is amply sufficient to create the desired bond between the joint parts and the adhesive during the setting period, and to provide a constant pressure follow-up as the adhesive film decreases in thickness during setting.

Preferably, a small plate of soft iron indicated at 16 is placed on top of the pile or joint at the start of the bonding operation. This plate may be called a pole piece or armature and it acts to increase the area of the magnetic field so as to increase the area of the parts being squeezed together by magnetic force, and in the case of thin gauge metal parts, the effect of the plate 16 is to increase the applied magnetic force. Moreover, by using the small plate or armature on top of the joint and the magnet under the joint, the joint parts may be of non-magnetic or even non-metallic materials, because the lines of force pulling the plate 16 toward the magnet will exert a squeezing action on the joint parts which become an air gap in the magnetic field.

As shown in Fig. 3 the thickness of the film 13 has decreased substantially as compared with its thickness in the uncured condition, as shown in Fig. 2, and the film in the finished joint shown in Fig. 4 is still thinner. However, the squeezing force supplied by the magnet is sufficient to maintain the parts of the joint under a constant pressure which will establish the required bond during the entire setting period. If a thermo-setting adhesive is used, the necessary setting or curing temperatures used have no damaging effect on the materials of the permanent magnet, and the only maintenance cost on the magnet is an occasional recharging, which can be accomplished in a very few seconds.

In the form of the invention represented in Fig. 5, an electromagnet is shown applied to the joint to be bonded with adhesive film. The magnet includes the usual soft iron core 18 with a wire coil 19 wound around the core, the leads 20 and 21 of the coil being electrically connected to a source of electric current. In this form of the invention the soft iron plate may also be used on top of the joint if necessary or desirable. Coil-wound magnets of these types can be designed to deliver magnetic force of various amplitudes as may be required to suit the particular conditions of the application, and in this case the force delivered would be sufficient to compensate for adhesive shrinkage and apply constant squeezing pressure to the joint during the entire setting cycle of the adhesive.

Where electro-magnets are used the coil can be protected by a suitable coating, such as a coating of ceramic or silicone material, to insulate the coil and protect it from the setting temperatures where thermo-setting adhesives are used. While I have shown the magnetic cores of the magnets as being of straight bar shape, it will be understood that within the scope of the invention, the shapes of the magnets can be varied to conform to various irregular and curved joint surfaces as desired.

The novel clamping method and apparatus provides a constant squeezing pressure on the joint during the entire setting period of the bonding adhesive regardless of shrinkage, and the magnetic squeezing devices are quickly and easily applied to various irregular or difficultly accessible joint surfaces. Moreover, the mass of the magnets requiring handling or heating and cooling during the adhesive setting period is very small, and the maintenance cost of the magnets is almost negligible.

What is claimed is:

1. A magnetic device for squeezing together overlapping magnetizable elements of a joint having an intermediate time-setting adhesive film, said device including a bar magnet and a non-magnetic sleeve surrounding said bar magnet, and said magnet having sufficient magnetic force to exert constant squeezing pressure on the joint to compensate for shrinkage of the adhesive during its setting cycle.

2. A magnetic device for squeezing together overlapping elements of a joint having an intermediate time-setting adhesive film, said device including a magnet for contacting one side of the joint and an armature plate for contacting the other side, said magnet having sufficient magnetic force to exert constant squeezing pressure on the joint to compensate for shrinkage of the adhesive during its setting cycle.

References Cited in the file of this patent

UNITED STATES PATENTS

| Re. 20,429 | Koca | June 29, 1937 |
|---|---|---|
| 2,378,801 | Sidell et al. | June 19, 1945 |
| 2,443,582 | Lendo et al. | June 15, 1948 |
| 2,510,727 | Sussenbach | June 6, 1950 |
| 2,585,893 | Young | Feb. 12, 1952 |

FOREIGN PATENTS

| 571,598 | Great Britain | Aug. 31, 1945 |